July 12, 1966   J. W. WILKEY, JR   3,260,204
VELOCITY PACKAGE
Filed June 8, 1964   2 Sheets-Sheet 1

INVENTOR
JOHN W. WILKEY, JR.

BY

ATTORNEYS

July 12, 1966 J. W. WILKEY, JR 3,260,204
VELOCITY PACKAGE
Filed June 8, 1964 2 Sheets-Sheet 2
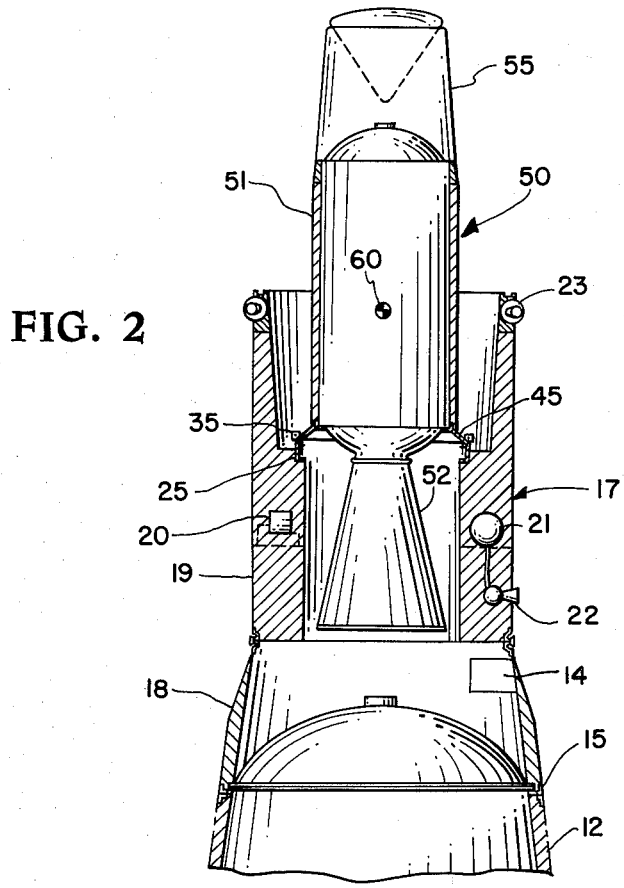
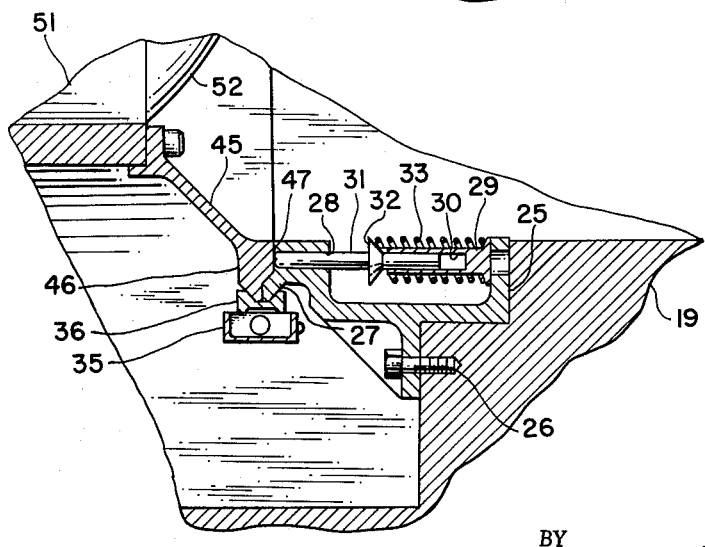
INVENTOR
JOHN W. WILKEY, JR.
BY
ATTORNEYS United States Patent Office 3,260,204
Patented July 12, 1966

3,260,204
VELOCITY PACKAGE
John W. Wilkey, Jr., Newport News, Va., assignor to the United States of America as represented by the Administrator of the National Aeronautics and Space Administration
Filed June 8, 1964, Ser. No. 373,591
9 Claims. (Cl. 102—49)

The invention described herein may be manufactured and used by or for the Government of the United States of America for governmental purposes without the payment of any royalites thereon or therefor.

This invention relates to a velocity package utilized in combination with a launch vehicle to increase the velocity potential and capability for spin stabilizing payloads in a manner that high trajectory error minimization and high mass ratio effect may be realized.

Many aeronautical and reentry experiments have been made by multistage solid fuel boosters such as Trail Blazer and Scout and larger payload velocity experiments have been conducted with larger liquid fuel vehicles such as Atlas. Although these vehicles function adequately, in general, they have been confined to the lower earth reentry velocities of from 18,000 to 25,000 feet per second (e.g. Project Mercury).

With the advent of Project Apollo, Planetary Venus and Mars, vehicle reentries at the velocity of from 37,000 feet per second to 44,000 feet per second, it is necessary to be able to perform experiments in this speed range with present vehicle capability.

Multirocket staging, or using a series or cluster of rocket motors, is the ordinary way of obtaining high altitude and velocities for payloads. Practically, however, this method is limited because there is a logarithmic relationship between available impulse and payload weight, so that there is a limit to the number of stages that can be added for increase in velocity. Generally, efficiency drops off to practically nothing after the sixth series of the stage. This means that by staging the presently available solid rockets, even up to six stages, that the size of the rocket payload that could be used for velocities over 30,000 f.p.s., would shrink to only a few pounds in size. Also, in this relationship of staging, it is the final rocket stage that plays the most important part of added velocity. For this reason it is extremely important that no unnecessary (non-payload) components be carried on the last rocket stage.

The large liquid fuel boost vehicles while offering best payload velocity potential without extensive staging lack certain important features such as, the lack of accurate control if spun up and therefore lack of necessary payload spin stabilization capability making a direct adaptation for this type of experiment unsatisfactory.

The present invention overcomes many of the above staging, spin stabilization and weight problems by utilizing a unique velocity package in combination with a large existing launch vehicle. The reentry payload realizes optimum velocity from the velocity package's auxiliary propulsion rocket carried thereby as the result of reducing the weight of the auxiliary propulsion rocket and combined payload. This is accomplished by using the guidance system of the launch vehicle to place the velocity package in a required trajectory, maintaining trajectory after vehicle separation with a self-contained velocity package control system, then spinning the velocity package and separating the spinning payload and auxiliary propulsion rocket (reentry package) without separation disturbances.

It is, therefore, an object of the present invention to provide a velocity package for use with existing launch vehicles wherein a payload velocity of from 37,000 to 44,000 feet per second may be realized.

An object of this invention is to provide a velocity which will accelerate a meaningful payload (neighborhood of 200 pounds) to the test velocity required.

Yet another object of this invention is to provide a velocity package wherein the propulsion unit and payload forming a part thereof has the smallest mass possible so to realize the greatest velocity possible.

Still another object of this invention is to provide a velocity package which utilizes the programmed trajectory of the launch vehicle for guidance, and is thereafter maintained on course by a simple control system.

Yet another object of this invention is to provide a velocity package wherein the spin rockets utilized for spin stabilization of the reentry package are located in the plane of the center of gravity of the velocity package thereof to minimize trajectory error.

Another object of this invention is to provide a velocity package having cold separation of the velocity package from the launch vehicle and the reentry package from the launch vehicle and the reentry package from the velocity package to minimize tipoff.

Still another object of this invention is to provide a velocity package wherein the rocket motor forming a part thereof is ignited after separation from the velocity package to avoid tipoff.

A further object of the invention is to provide a velocity which is more reliable and economical due to its simplicity of construction.

These and other objects and advantages of the invention will become more apparent upon reading the specification in conjunction with the accompanying drawings.

In the drawings:

FIG. 2 is a cross-sectional view of the velocity package; and

FIG. 3 is a cross-sectional view showing structure for cold separation of the reentry package from the velocity package.

Figure 1:
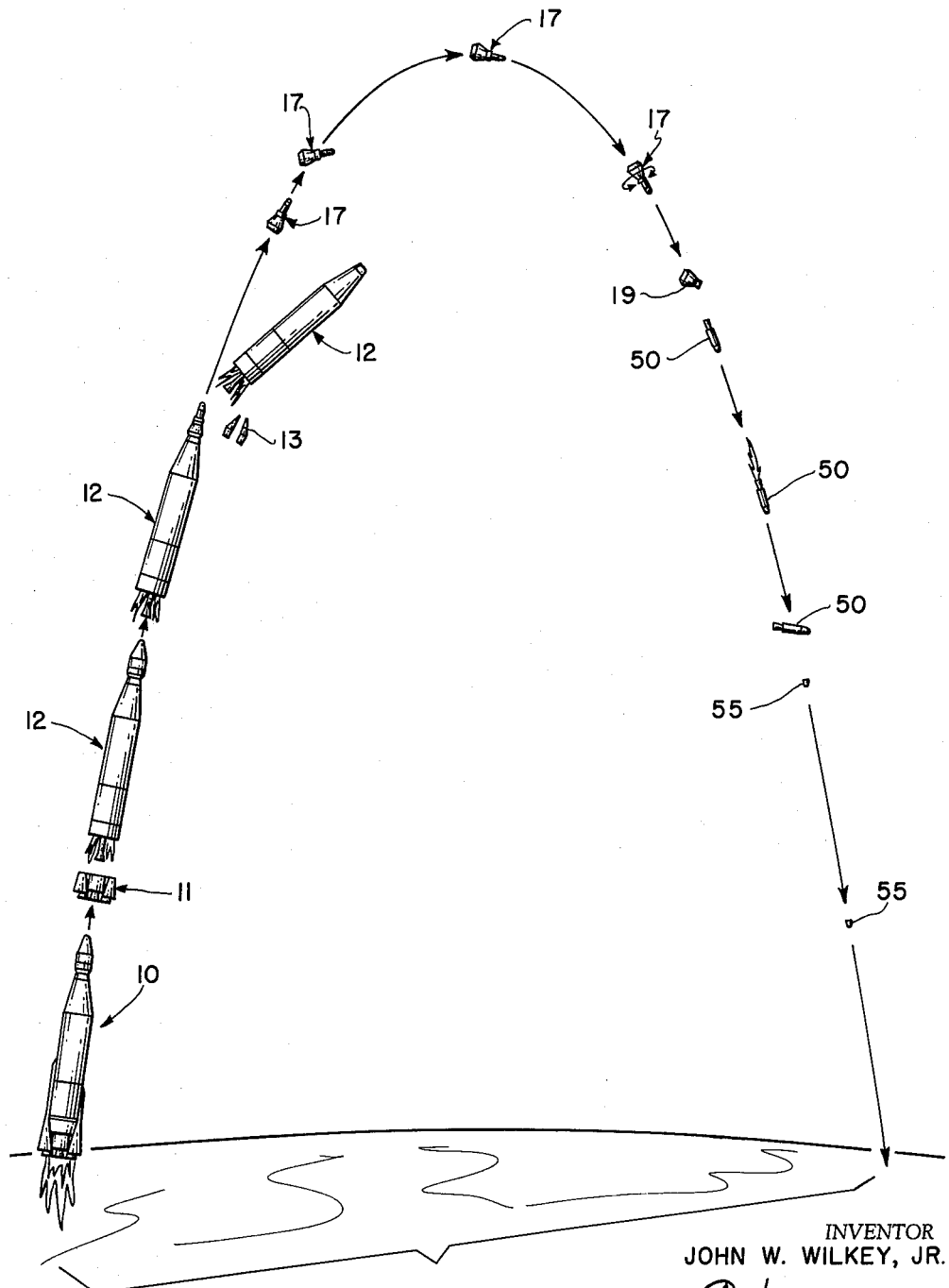
FIG. 1 is a pictorial view showing a launch to reentry sequence of the velocity package and its associated components.

Generally, this invention relates to a device and method of use of this device whereby the utmost velocity may be obtained from a predetermined mass. This is accomplished by utilizing an existing launch vehicle, such as the Atlas, in combination with a specially designed velocity package. Upon firing the launch vehicle an initial velocity of approximately 18,000 feet per second is attained. The guidance system of the launch vehicle is utilized to determine the trajector of the velocity package, this trajectory being maintained with a self-contained velocity package control system. The velocity package is separated from the launch vehicle by a cold separation technique to prevent trajectory disturbance. The velocity package spin rockets, the ignition system for the combined propulsion unit and payload forming the reentry package, the attitude control system, and all other support structure for the reentry package is carried by the housing for the velocity package. Thus, all structure which is not absolutely essential to the reentry package is carried by the velocity package housing. After energization of the spin rockets the reentry package is separated from the velocity package housing by a cold separation technique. The thrust of the propulsion unit is utilized to maximum advantage to propel the reentry package to the velocity necessary to simulate the reentry speed of a space vehicle such as Apollo. When the desired velocity is reached the propulsion unit is also separated from the payload by a cold separation technique.

Referring now more specifically to the details of the invention, FIG. 1 shows the various components necessary to obtain the desired high velocities of a payload. The entire space vehicle is designated generally by the reference numeral 10. It includes the booster 11, the sustainer 12, the velocity package 17. A heat shield 13 surrounds the velocity package 17 to protect it during launch. A guidance system 14 (shown diagrammatically), of conventional design, similar to that shown and described in National Aeronautics and Space Administration Technical Note D–1240, may be used with programing changes to the equipment. The booster 11, sustainer 12, and heat shield 13 are of conventional design and might constitute those of the Atlas launch vehicle; however, it is to be understood that other launch vehicles may be utilized. The structure for ejecting the heat shield 13 is also of conventional design, various state of the art techniques being available to accomplish this function.

The velocity package 17 (FIG. 2) includes an adapter 18 which is a cylindrical member utilized for mating the remainder of the velocity package to the sustainer stage of the launch vehicle. The adapter 18 is secured to the sustainer 12 by a clamp 15, such as a "V" band type clamp or other clamp structure. The clamp may be released by a pyrotechnic device, the clamp and pyrotechnic apparatus all being of conventional design.

The velocity package 17 further includes a housing 19 which is also of generally cylindrical design. The lower end of the housing 19 is fixed to the adapter 18 by a clamp, threaded connection, bolts or welding depending upon design requirements. The other end of the housing supports the heat shield 13 which protects the remainder of the velocity package. The housing carries the reaction jet control system which includes reference gyros 20, nitrogen bottles 21, reaction jets 22 and the necessary connections between the system. Spin rockets 23 are located on the upper end of the housing 21 and are spaced at equal intervals about the circumference thereof. The spin rockets 23 may be of the solid propellant type, often utilized for spin stabilization. The housing 19 is of sufficient heighth or length such that the spin rockets 23 may be located in the plane of the center of gravity 60 of the velocity package. The purpose for this will be explained in greater detail hereinafter.

Approximately midway of the housing 19 on the inner surface thereof there is formed a shoulder which supports an annular separator bracket 25 (FIGS. 2 and 3) secured thereto by fasteners 26. The separator bracket 25 is generally U-shaped in cross section and has a flange 27 formed off the one leg thereof. Plunger apertures 28 are formed in this leg at equally spaced intervals thereabout and receive the plungers 31 of ejector apparatus. The ejector apparatus also includes a series of casings 29 fixed to the separator bracket 25, having bores 30 which receive the other end of plungers 31. Separator springs 33 surround the casings 39 and will bear against the ends thereof and shoulders 32 formed on the plungers 31. The ejector apparatus is utilized to accomplish a uniform cold separation in a manner to be explained more fully hereinafter.

A motor separation arm or annulus 45 has a flange 46 which mates with the flange 27 of bracket 25. The separation arm 45 is fixed to the rocket motor or propulsion unit 50 by conventional threaded fasteners, welding or some other well known technique. A "V" band type clamp 35 having a clamping ring 36 mating with the flanges 27 and 46 surrounds the separator bracket and separator arms 25 and 45 respectively. The band is released by a conventional pyrotechnic device.

The reentry package 50 (FIG. 2) which is part of the velocity package 17 consists of the rocket motor or propulsion unit 51 and the payload 55. The reentry package 50 thus releasably secured to the housing 17 by the "V" band clamp 35 which engages the flange of the separator bracket and arm 25 and 45 respectively.

The rocket motor 51 is of conventional design and has a nozzle 52. It is of the solid propellant type and carries a delayed ignition igniter all of which are state of the art.

The time delayer igniter is energized upon separation of the reentry package from the velocity package. Batteries and other components necessary for ignition are carried by the housing 19 or adapter 18 to minimize the weight of the reentry package.

The payload 55 for purposes of illustration is shaped like the Apollo spacecraft, although it could be any other shape, and is heavily instrumented to perform reentry experiments. A spring ejection system (not shown) is utilized to separate the payload from the spent rocket motor 51 when the reentry package reaches a given point in the reentry portion of the trajectory.

*Operation and method*

In operation the space vehicle 10 is launched from a range as shown in FIG. 1. Following the sequence in FIG. 1 the booster engines of the launch vehicle 11 are jettisoned, thereafter, the heat shield separates and the sustainer burns out. During this interval the vehicle guidance system is operational and places the vehicle on the desired flight path. The velocity package 17 is then separated from the launch vehicle by release of the V band clamp. The nonspinning velocity package then coasts using its inertial reference (gyro)-reaction jet control system, to hold trajectory. The gyros become operational upon separation of the velocity package and takes its reference from this point. Any deviation from the trajectory is corrected by nitrogen discharged periodically from the reaction jets as commanded by the gyros. This system is inactivated prior to spin up to prevent possible misalignment. Shortly after the start of reentry the spin rockets are energized to spin stabilize the reentry package. Separation of the velocity package housing 19 from the reentry package 50 then occurs. Separation is accomplished by releasing the clamp 35. This allows the springs 33 to expand forcing the plungers 31 against the flange 46 thereby separating the reentry package from the remainder of the velocity package. During this separation the igniter of propulsion unit 51 is energized for its delayed ignition. Thereafter the spinning payload 55 is separated from the propulsion unit 50. As travel continues back toward the earth instrumentation carried by the payload 55 is operating and information recorded. Since this period may involve ionization blackout, the data gathered is played back during the remaining descent of the payload.

From the above operational description of the spacecraft the method for obtaining high velocities becomes apparent. This method includes the idea of launching a velocity package with a state of the art vehicle. The guidance system of the vehicle operates to place the payload containing velocity package on the proper trajectory and thereafter, only a relatively simple gyro controlled jet reaction system is necessary to maintain course. The cold separation and spin stabilization functions of the velocity package are accomplished in a manner such that there is minimum tipoff of the reentry package and its payload. By stripping the reentry package of all unnecessary weight (velocity package housing), possible due to the preceding steps, a meaningful payload velocity is attained which was heretofore impossible.

From the above description it is believed clear that many components have been combined in a new manner to produce a unique arrangement and method for obtaining velocities similar to that of a reentering Apollo spacecraft. This combination, therefore, provides a device whereby valuable information may be obtained experimentally before lives are risked in a space vehicle such as Apollo. This is accomplished without the necessity of excessive staging resulting in added costs and the sacrifice of reliability. By utilizing the guidance system of the launch vehicle for payload trajectory and then a simple control system, the problem of an unpractical guidance system operating while the velocity package is spinning, has been avoided. By using a cold separation technique for the various stage and component separations, tipoff is minimized to the point of being almost eliminated. Since the spin rockets are mounted on the plane of the center of gravity of the velocity package, practically all all of the wobble or misalignment is taken out of the velocity package during spin stabilization. No onboard guidance of the velocity package and its payload is necessary after the velocity package separates due to a relatively simple velocity package inertial attitude control system, the spin stabilization and cold separation techniques. In actual tests of the velocity package using the above described method and apparatus an error of less than one half of one percent was experienced.

Although the technique employed here has been described primarily in relationship to a velocity package, it should be recognized that it is within the broadest aspect of the invention to utilize this apparatus and technique for other missions, such as for example, ballistic missiles and placing a payload in orbit.

Since there are, obviously, many modifications and variations of the present invention possible in the light of the above teachings, it is therefore to be understood that, within the scope of the appended claims, the invention may be practiced otherwise than as specifically described.

What is claimed as new and desired to be protected by Letters Patent of the United States is:

1. A device for producing high velocities to determine the capability of spacecraft reentry configurations, comprising: a launch vehicle, a velocity package carried by said launch vehicle and having a center of gravity; guidance means for placing said launch vehicle in a predetermined trajectory; means for separating said velocity package from said launch vehicle; means for thereafter controlling the velocity package; spin rocket means located on said velocity package such that it is spin-stabilized after separation from said launch vehicle and utilized to maintain trajectory without additional guidance from said means for controlling the velocity package; propulsion and payload means forming part of said velocity package; and means for separating said propulsion and payload means from the remainder of said velocity package upon reaching a designated reentry trajectory position.

2. A device for producing high velocities to determine the capability of spacecraft reentry configurations as in claim 1 where said spin rocket means is located in a plane perpendicular to a longitudinal axis of the velocity package and passing through the center of gravity of the velocity package.

3. A device for producing high velocities to determine the capability of spacecraft reentry as in claim 1 wherein said means for separating said propulsion and payload means from said velocity package includes a V band clamp and spring-loaded ejectors.

4. A device for producing high velocities to determine the capability of spacecraft reentry configurations, comprising: a launch vehicle, a velocity package carried by said launch vehicle and having a center of gravity; guidance means for placing said launch vehicle in a predetermined trajectory; means for separating said velocity package from said launch vehicle; reaction jet control means for initially maintaining said velocity package on trajectory; spin rocket means located in a plane perpendicular to a longitudinal axis of the velocity package and passing through the center of gravity of said velocity package for fixing said velocity package trajectory; propulsion means carrying a payload forming a part of said velocity package both having the lowest possible mass; means for separating said propulsion means and payload from the remainder of the velocity package and for igniting said propulsion means; and means for separating said payload from said propulsion means upon attaining at least the velocity of a vehicle reentering from a spatial vacuum.

5. A device for producing high velocities to determine the capability of spacecraft reentry configurations, comprising: a launch vehicle, guidance means for placing said launch vehicle in a predetermined trajectory; a velocity package carried by said launch vehicle; said velocity package having an adapter, a housing, a propulsion unit and a payload; said adapter being connected to the launch vehicle by a releasable clamp and being fixed to said housing; said housing having a bracket; said propulsion unit carrying a flange mating with said bracket; a releasable clamp joining said flange and bracket; said propulsion unit carrying said payload; said propulsion unit being separated from said housing by said releasable clamp and thereafter ignited; and means for separating said payload from said propulsion unit upon attaining at least the speed of a body reentering from a spatial vacuum.

6. A device for producing high velocities to determine the capability of spacecraft reentry configurations as in claim 5 wherein said velocity package includes spin rocket means for spin-stabilizing said propulsion unit and payload after separation from said launch vehicle; said spin rocket means being carried by said housing and located in the plane of a center of gravity perpendicular to a longitudinal axis of the velocity package and passing through said velocity package to minimize tipoff; the location of said spin rocket means minimizing the mass of said propulsion unit and payload.

7. A device capable of producing high velocities comprising: a launch vehicle; a velocity package carried by said launch vehicle and having a center of gravity; means for executing a cold separation of said velocity package from said launch vehicle; a propulsion unit and payload forming a part of said velocity package; means for spin stabilizing said propulsion unit and payload after separation from said launch vehicle located on structure other than said propulsion unit and payload; said means for spin stabilization being mounted in a plane perpendicular to a longitudinal axis of the velocity package and passing through the center of gravity of said velocity package; means for executing a cold separation of said propulsion unit and payload from said velocity package; and guidance means carried only by said launch vehicle for determining the flightpath of said velocity package and the associated propulsion unit and payload.

8. The method of simulating the velocity of a body reentering the atmosphere from a spatial vacuum comprising: launching a test body into a spatial vacuum on a desired flightpath with a launch vehicle; separating the test body from a launch vehicle; thereafter spin-stabilizing the test body; separating the spin-stabilization structure from the test body; and accelerating the test body back into atmosphere.

9. The method of simulating the velocity of a body reentering the atmosphere from a spatial vacuum comprising: launching a test body on a desired flightpath with a launch vehicle; using a guidance system of the launch vehicle to determine test body trajectory; separating the test body from the launch vehicle; thereafter spin-stabilizing the test body in a manner to fix the test body on the same trajectory; separating the spin-stabilization structure from the test body; and accelerating the test body to the velocity of a reentry vehicle.

(References on following page)

References Cited by the Examiner

UNITED STATES PATENTS

| | | | |
|---|---|---|---|
| 2,959,129 | 11/1960 | Warren | 102—49 X |
| 2,968,245 | 1/1961 | Sutton et al. | 102—51 |
| 3,131,635 | 5/1964 | Steinmetz et al. | 102—49 X |

FOREIGN PATENTS 1,191,494  4/1913  France.

OTHER REFERENCES

NASA TN D-1240, NASA Scout ST-1 Flight-Test Results and Analyses, Launch Operations, and Test Vehicle Description. Robert J. Mayhue, compiler, June 1962. (Pages 1–13 and 90 relied on.)

NASA TN D-1395, Simulator Studies of Simple Attitude Control for Spin-Stabilized Vehicles. H. D. Garner et al., September 1962.

BENJAMIN A. BORCHELT, *Primary Examiner.*

SAMUEL FEINBERG, *Examiner.*

V. R. PENDEGRASS, *Assistant Examiner.*